United States Patent [19]
Ginzburg

[11] Patent Number: 5,557,673
[45] Date of Patent: Sep. 17, 1996

[54] AUDITORY ASSISTANCE APPARATUS AND METHOD

[75] Inventor: Boris Ginzburg, Migdal Haemek, Israel

[73] Assignee: AVR Communications, Ltd., Migdal Haemek, Israel

[21] Appl. No.: 329,148

[22] Filed: Oct. 25, 1994

[51] Int. Cl.$^6$ .............................. H04M 1/00; H04R 25/00
[52] U.S. Cl. .................................. 379/443; 379/52; 381/68
[58] Field of Search ........................... 379/52, 443, 444; 381/68, 68.2, 68.4, 68.6, 68.7, 69

[56] References Cited

U.S. PATENT DOCUMENTS

| | | | |
|---|---|---|---|
| 3,396,245 | 8/1968 | Flygstad | 379/443 |
| 4,777,474 | 10/1988 | Clayton | 379/52 |
| 5,010,575 | 4/1991 | Marutake et al. | 379/52 |

OTHER PUBLICATIONS

Compton, C. L., "Providing Effective Telecoil Performance With In-The-Ear Hearing Instruments," *The Hearing Journal*, vol. 47, No. 4 (Apr. 1994), pp. 23–26, 28, 29, 32, 33.

Preves, D. A., "A Look at the Telecoil—Its Development and Potential." *SHHH Journal*, Sep./Oct. 1994, pp. 7–10.

*Primary Examiner*—Jeffery Hofsass
*Assistant Examiner*—Jack Chiang
*Attorney, Agent, or Firm*—Ladas & Parry

[57] ABSTRACT

An auditory assistance apparatus and method for use with a sound signal source which also produces a magnetic field propagated along a magnetic field axis to increase the signal-to-noise ratio with respect to ambient noise. A pair of magnetic pickup coils of substantially the same electrical and magnetic parameters, but of opposite polarity, are located close to the sound signal source and oriented symmetrically with respect to the geometrical axis of the auditory assistance apparatus with the magnetic axes of the pickup coils substantially parallel to each other and substantially perpendicular to the magnetic field axis of the sound signal source and the geometrical axis of the auditory assistance apparatus; and an amplifier which adds and amplifies the outputs of the serially-connected pickup coils and feeds same to an audio transducer for conversion to sound.

20 Claims, 4 Drawing Sheets

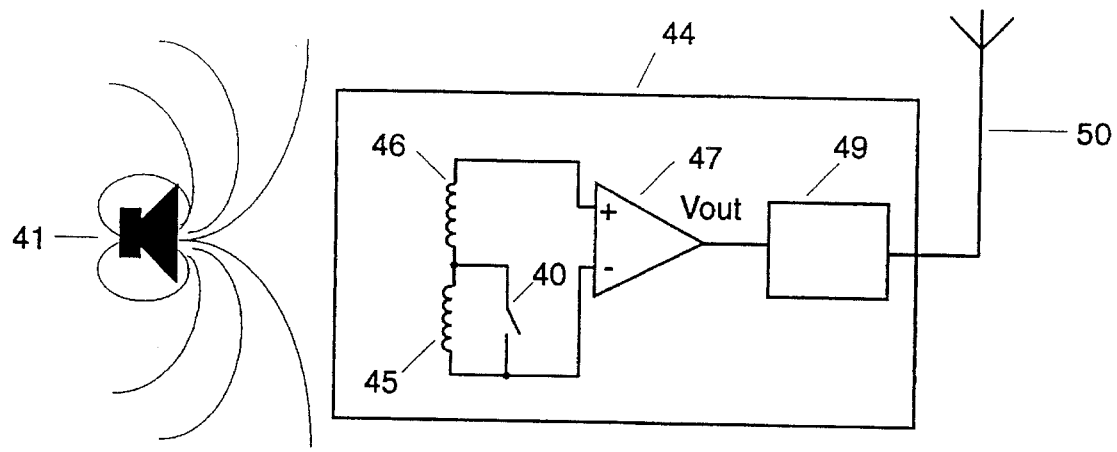
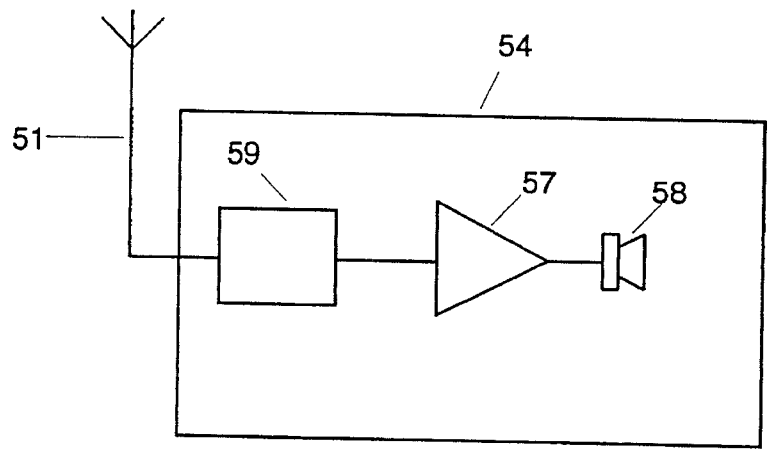
Fig. 3
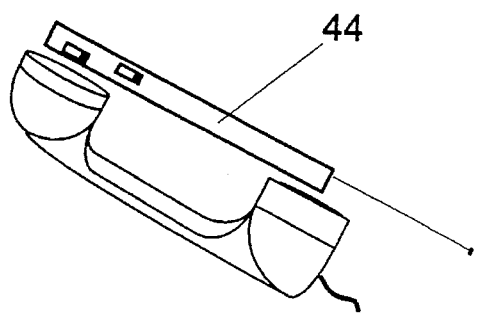
Fig. 3a
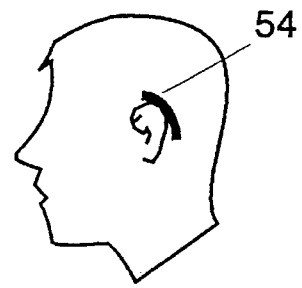
Fig. 3b

AUDITORY ASSISTANCE APPARATUS AND METHOD

FIELD AND BACKGROUND OF THE INVENTION

The present invention relates to auditory assistance apparatus. The invention is particularly applicable in hearing aids for the hearing impaired, and is therefore described below with respect to this application.

Hearing aids normally pick up the sound via a microphone transducer, amplify the sound via a low power audio amplifier, and transmit the sound to the user's ear via an acoustic transducer. If a microphone is used, the ambient acoustic noise reduces the signal-to-noise ratio; and when the sound signal is weak (as in the case of a telephone speaker), the noise may actually override and mask the signal so a to make the signal non-detectable.

Some hearing aids feature a magnetic pickup coil, usually termed a "Telecoil", or "T-coil". Such a coil is used for picking up sounds via magnetic induction, typically from a telephone's receiver or from a dynamic speaker having a magnetic core. Another application of such pickup coils is to pick up magnetic induction transmitted by an induction loop, typically installed around the walls in theaters, classrooms, churches, and the like.

The pickup coil is normally connected to the hearing aid audio amplifier and to the output acoustic transducer. The pickup coil of the hearing aid is usually a cylindrical coil of small size and of many windings around a special core. The sensitivity of such pickup coils is not more than 3–4 mV/A/m. The typical T-coil output electrical signal induced by telephone receivers is about 50–100 µV. This signal can only be picked up when the axis of the coil's magnetic core is parallel to the magnetic field's direction, and the pickup coil is situated as close as possible to the telephone receiver or speaker.

Hearing aids including such a pickup coil are especially useful for listening to the telephone since the telephone's receiver produces a very weak sound. Such a coil does not pick up the acoustic ambient noise and thus allows a much better signal-to-noise ratio than a conventional microphone. The improvement in the signal-to-noise ratio permitted by a magnetic pickup coil also results from the fact that the entire attenuation of the magnetic field is at a distance of about 30–40 cm from the sound signal source, while th entire attenuation of the acoustic field of a sound signal source is at a distance of about 30–40 m, a difference of about 1:100.

Magnetic pickup coils, however, are highly sensitive to magnetic noise present in the home, office, street, industrial environments, etc., induced in the audio band. A major source of such ambient magnetic noise is the 50/60 Hz frequency of the AC power line and its harmonics. Other sources include electrical apparatus as transformers, TV and computer monitors, communication lines, electrical motors, and electrical generators, all of which tend to produce low frequency magnetic noise and thereby degrade the potential signal-to-noise ratio of a hearing aid using magnetic pickup coils. Most hearing aids having magnetic pickup coils, therefore, include a high pass filter to attentuate this low frequency noise by cutting off the frequency band below 1 KHz. However, the typical hearing loss is in the high frequencies, and therefore the user of such a hearing aid is denied hearing the lower band frequencies where the user generally has better hearing.

In addition, the magnetic pickup coil must generally be oriented in the direction of minimum noise sensitivity in order to decrease the magnetic noise. However, this orientation may not correspond to the optimal conditions providing an acceptable or optimum level of the desired source signal. The foregoing situation is typical for magnetic loop signal listening and telephone listening.

OBJECTS AND BRIEF SUMMARY OF THE INVENTION

An object of the present invention is to provide an auditory assistance apparatus having advantages in the above respects. Another object of the invention is to provide an apparatus, and also a method, of increasing the signal-to-noise ratio of a sound signal source when using a magnetic pickup apparatus.

According to one aspect of the present invention, there is provided an auditory assistance apparatus for use with a sound signal source which also produces a magnetic field propagated along a magnetic field axis, the auditory assistance apparatus, comprising: a pair of magnetic pickup coils of substantially the same electrical and magnetic parameters, but of opposite polarity, to be located close to the sound signal source. The pair of coils are electrically connected together in series and are mounted on separate cores having parallel axes oriented symmetrically with respect to the geometrical axis of the auditory assistance apparatus with the axes of the cores substantially perpendicular to the magnetic field axis of the sound signal source and the geometrical axis of the auditory assistance apparatus; an amplifier connected to receive the outputs of the series-connected pair of pickup coils; and an audio transducer connected to the amplifier for converting its output to sound.

As will be described more particularly below, the electrical voltages induced in the two pickup coils by the magnetic signal will be in the same phase, and therefore will be added; but the voltages induced in the two coils by the magnetic noise will be in opposite phases, and therefore will cancel each other, thereby substantially increasing the signal-to-noise ratio.

Where the apparatus is used in a magnetic field produced by an induction loop installed in a large area, the magnetic field created by the loop is relatively uniform because of the large area covered by the loop (e.g., an auditorium), and therefore the phase cancelling produced by the two pickup coils will decrease the signal level. According to another feature of the invention, therefore, the apparatus is provided with a manual electrical switch for manually shunting one of the pickup coils so that only a single pickup coil, rather than the pair of pickup coils, will be effective to pick up the magnetic signal.

Preferably, the pair of pickup coils are coaxial, and are spaced a distance of less than 3 cm from the sound signal source and a distance of less than 3 cm from each other.

Further features and advantages of the invention will be apparent from the description below.

BRIEF DESCRIPTION OF THE DRAWINGS

The invention is herein described, by way of example only, with reference to the accompanying drawings, wherein:

FIG. 3 schematically illustrates a further auditory assistance apparatus constructed in accordance with the present invention including a transmitter section coupled by a wireless link to a receiver section;

FIG. 3a illustrates the transmitter section of the apparatus of FIG. 3 placed near the transmitter/speaker of a telephone handset;

FIG. 3b illustrates the receiver section of the apparatus of FIG. 3 incorporated in a hearing aid to be worn by a user;

DESCRIPTION OF PREFERRED EMBODIMENTS

Figure 1:
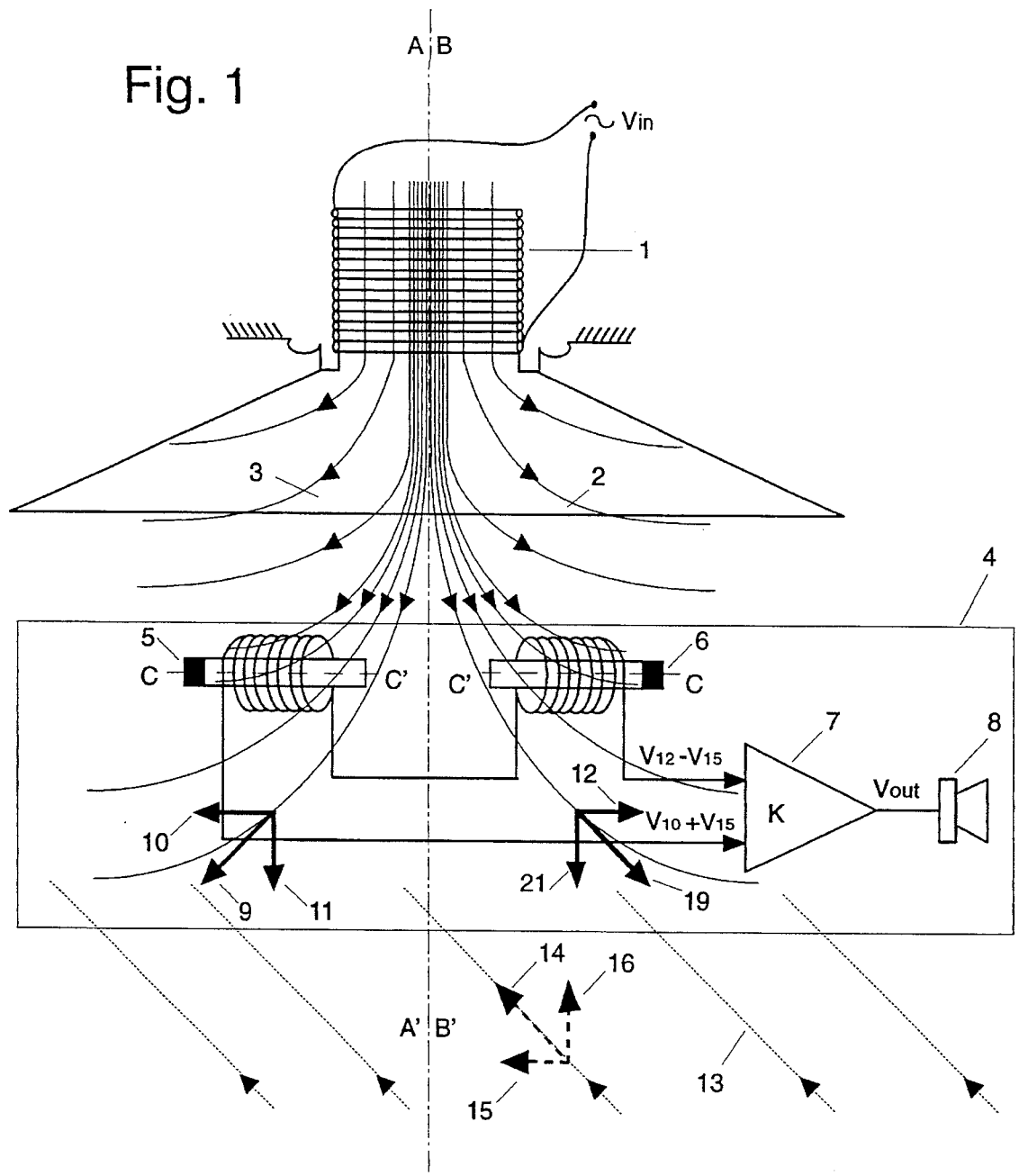
FIG. 1 schematically illustrates one form of auditory assistance apparatus constructed in accordance with the present invention.

The apparatus illustrated in FIG. 1 comprises a sound signal source, generally designated 1, such as the speaker of a telephone receiver or an audio dynamic speaker having a moving coil. Sound signal source 1 thus also produces a magnetic field, schematically indicated by field lines 2, 3, propagated along the magnetic field axis A–A'.

FIG. 1 also illustrates a hearing apparatus, generally designated 4, located close to the sound signal source 1 and having a geometrical axis B–B' coinciding with the magnetic field axis A–A' of the sound signal source 1. Hearing apparatus 4 includes a pair of magnetic pickup coils 5, 6 (sometimes referred to as Telecoils or T-coils) of substantially the same electrical and magnetic parameters, but of opposite polarity, located symmetrically on opposite sides of the geometrical axis B–B' of the hearing apparatus 4. The magnetic axes C–C' of the two pickup coils 5, 6 are substantially parallel to each other, in this case coaxial, and are perpendicular to the magnetic field axis A–A' of the sound signal source 1 and the geometrical axis B–B' of the hearing apparatus 4.

The outputs of the two pickup coils 5, 6 are connected together in series and are applied to the input of an amplifier 7. The output of amplifier 7 is applied to an audio transducer 8, such as a speaker, for converting the amplifier output to sound.

In FIG. 1, the magnetic field indicated by field lines 2, 3, produced by the sound signal source 1 are illustrated by magnetic flux vectors 9 and 19; whereas the magnetic field produced by an interfering source is indicated by field lines 13 and illustrated by magnetic flux vector 14. Only the horizontal components of these magnetic flux vectors (i.e., vectors 10 and 12 of the sound signal source magnetic field, and vector 15 of the interfering source magnetic field) are effective to generate voltages in the two pickup coils 5, 6; that is, the vertical components 11, 21 and 16, of these magnetic flux vectors do not generate voltages in the pickup coils 5, 6.

It will thus be seen that the magnetic flux vectors 9, 19 of the sound signal source 1 induce voltages, $V_{10}$, $V_{12}$, in the two pickup coils 5, 6. On the other hand, the magnetic flux vector 14 of the interfering noise source 13 induces a voltage $V_{15}$ in pickup coil 5 which is of the same polarity as voltage $V_{10}$, and induces a voltage $V_{15}$ in pickup coil 6 which is of the opposite polarity as voltage $V_{12}$.

This occurs because the coil sizes, and the distance between the coils, is extremely small relative to the distance to the interfering (noise) magnetic field source 13, which is essentially spread over a much larger area. In other words, the two coils 5, 6, are located in the far field of the interference source where the magnetic field is uniform and has no gradient inside the hearing apparatus including the two pickup coils 5, 6. The electrical signals induced in coils 5, 6 by the interfering (noise) magnetic field 13 will therefore be substantially the same in any orientation of the two pickup coils 5, 6, but in opposite polarities.

It will thus be seen that the amplified signal induced in the two pickup coils 5, 6, by both the signal source 1 and the interference (noise) magnetic field 13 will be as follows:

$$Vout = K[(V_{10} + V_{15}) + (V_{12} - V_{15})]$$
$$= K(V_{10} + V_{12})$$

where K is the amplification coefficient of the hearing apparatus amplifier 7.

Preferably, the two coils are spaced a distance of no more than 3 cm from the signal source 1, and a distance of less than 3 cm from each other. As one example, the size of the two coils 5, 6 may be 2 cm, the distance between the coils may be 1 cm, and the distance of the two coils from the signal source 1 may be 3 cm.

It will thus be seen that the arrangement illustrated in FIG. 1 permits:

(a) the sensitivity of the hearing apparatus equipped with a magnetic pickup to be increased as compared to prior art apparatus;

(b) the hearing apparatus to be oriented in any position and to obtain a maximum signal noise level irrespective of the location of the magnetic interference noise signal; and (c) the magnetic interference noise to be cancelled or substantially reduced and thereby to substantially increase the output signal-to-noise ratio.

The apparatus illustrated in FIG. 1 will not be efficient when used to pick up the magnetic field produced by an induction loop installed in a large area, such as an auditorium. Thus, because the magnetic field created by the loop is relatively uniform over the large area covered by the loop, the use of two pickup coils in the hearing apparatus will decrease the signal level because of phase cancelling.

Figure 2:
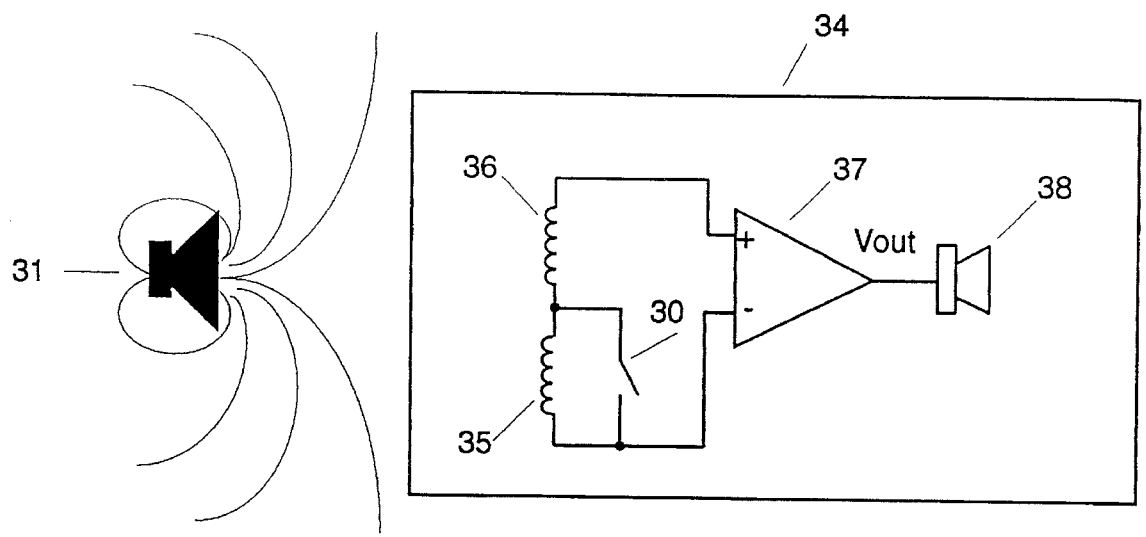
FIG. 2 schematically illustrates a second form of auditory assistance apparatus constructed in accordance with the present invention.

FIG. 2 illustrates the apparatus of FIG. 1 provided with a manual switch, as shown at 30, for selectively manually shunting one of the pickup coils, in this case coil 35; this would enable only the other pickup coil, 36, to sense the magnetic fields generated by both the signal source, shown at 31, and the noise source (13, FIG. 1). In all other respects, the hearing apparatus 34 illustrated in FIG. 2 is constructed, and operates in the same manner, as described above with respect to FIG. 1. Thus, it includes an amplifier 37 for amplifying the outputs of the two magnetic pickup coils 35, 36 (or only of coil 36 if coil 35 is disabled by manual switch 30), and an audio transducer for converting the amplified output to sound. During the normal use of the hearing apparatus 34, switch 30 would be open to thereby enable both of the pickup coils 35, 36; but when the apparatus is used in a magnetic field produced by an induction loop (e.g., a installed in a large auditorium) switch 30 would be manually closed to thereby enable only pickup coil 36.

Figure 2A:
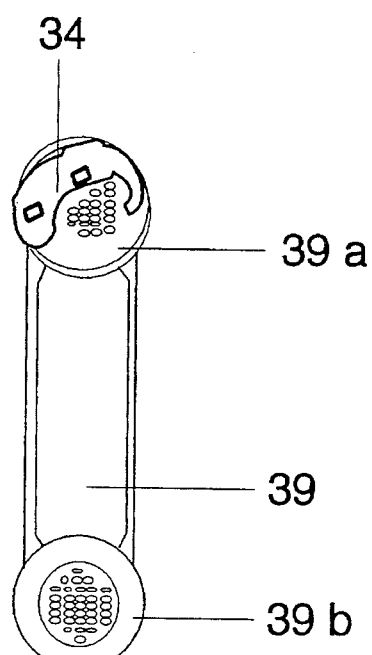
FIG. 2a illustrates the apparatus of FIG. 1 as placed near the receiver/earpiece section of a telephone handset.

FIG. 2a illustrates a telephone handset 39 including a receiver/earpiece section 39a and a transmitter/speaker section 39b. As shown in FIG. 2a, the hearing apparatus 34 illustrated in FIG. 2 is placed near the receiver/earpiece section 39a to enhance the signal-to-noise ratio of the sound outputted by that section.

FIG. 3 illustrates another embodiment of the invention, wherein the two magnetic pickup coils, therein designated 45, 46, are included in a transmitter section 44; and the audio transducer, therein designated 58, is included in a receiver section 54 coupled via a wireless link to the transmitter section 44. Thus, the transmitter section 44 includes not only the two pickup coils 45, 46, located and oriented with respect to the sound signal source 41 as described above, but also a manual switch 40 for selectively shunting coil 45, an amplifier 47 for amplifying the outputs of the coils, and an FM transmitter 49 which transmits the output via an antenna 50 to the receiver section 54. The receiver section 54 receives the transmission via its antenna 51, demodulates the received signal in circuit 59, amplifies the output of circuit 59 in amplifier 57, and then feeds the amplified output to the audio transducer 58 which converts the output to sound.

As one example, FIG. 3a illustrates the transmitter section 44 placed near the receiver/earpiece section of a telephone handset 44; and FIG. 3b illustrates the receiver section 54 incorporated in a hearing aid applied to the ear of the user.

Figure 4:
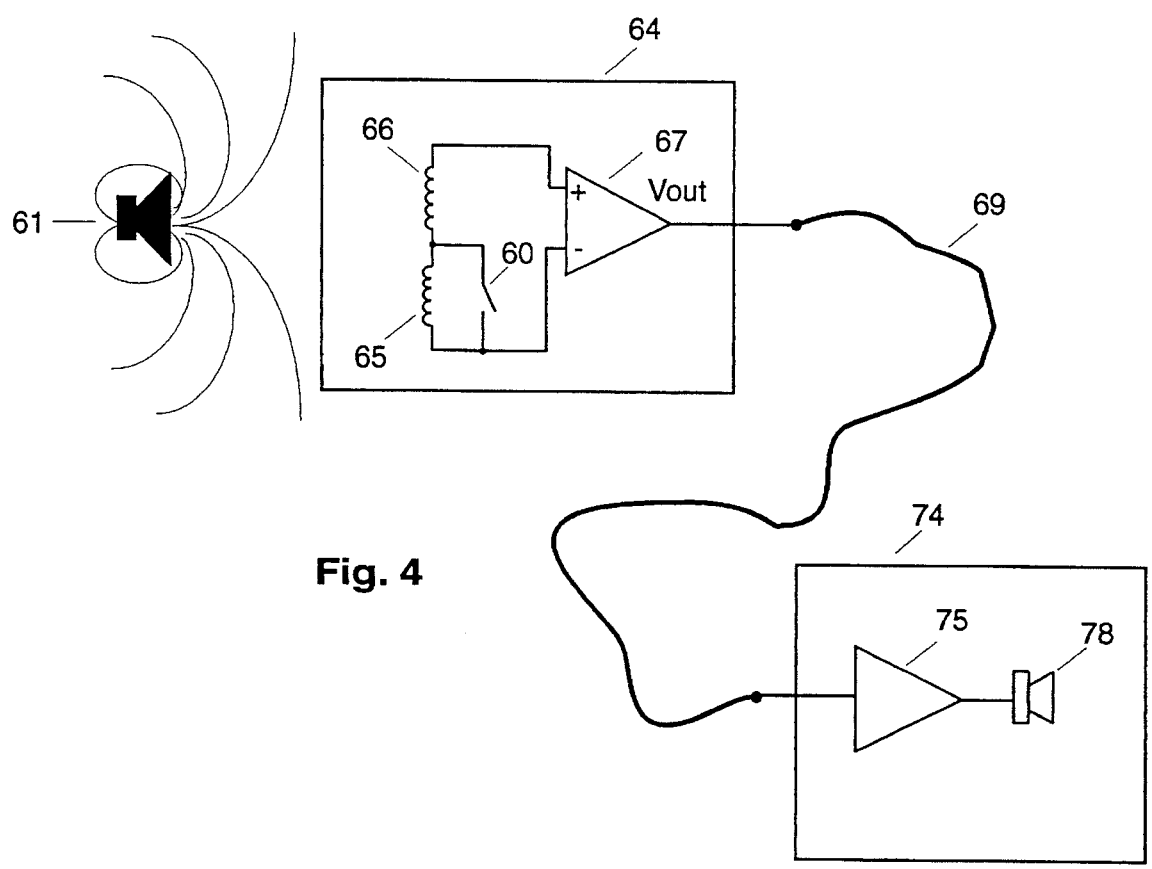
FIG. 4 illustrates a further auditory assistance apparatus constructed in accordance with the invention and including a receiver section wire-connected to a transmitter section.

FIG. 4 illustrates the apparatus as also including a transmitter section 64 containing the magnetic pickup coils 65, 66, manual switch 60, and amplifier 67, located adjacent the signal source 61. In this case, the transmitter section 64 is connected by a wire 69 to the receiver section 74 containing the receiver amplifier 75 and the audio transducer 78. In all other respects, the apparatus illustrated in FIG. 4 is constructed and operates in the same manner as described above.

While the invention has been described with respect to several preferred embodiments, it will be appreciated that these are set forth merely for purposes of example, and that many other variations, modifications and applications of the invention may be made.

I claim:

1. An auditory assistance apparatus for use with a sound signal source which also produces a magnetic field propagated along a magnetic field axis, said auditory assistance apparatus, comprising:
   a pair of magnetic pickup coils of substantially the same electrical and magnetic parameters, but of opposite polarity, to be located close to said sound signal source;
   said pair of coils being electrically connected together in series and being mounted on separate cores having parallel axes oriented symmetrically with respect to the geometrical axis of the auditory assistance apparatus with the axes of the cores substantially perpendicular to said magnetic field axis of the sound signal source and said geometrical axis of the auditory assistance apparatus;
   an amplifier connected to receive the outputs of said pair of series-connected pickup coils;
   and an audio transducer connected to said amplifier for converting its output to sound.

2. The apparatus according to claim 1, further including a manual electrical switch for manually shunting one of said pickup coils.

3. The apparatus according to claim 1, wherein the magnetic axes of the pair of pickup coils are coaxial.

4. The apparatus according to claim 1, in combination with a sound signal source in the form of a telephone speaker.

5. The apparatus according to claim 1, in combination with a sound signal source in the form of a dynamic speaker having a magnetic core.

6. The apparatus according to claim 1, in combination with a sound signal source in the form of a telephone speaker incorporated into the receiver/earpiece section of a telephone handset.

7. The apparatus according to claim 1, wherein said audio transducer is connected to said amplifier by a wire connection.

8. The apparatus according to claim 1, wherein said audio transducer is connected to said amplifier by a transmitter transmitting the output of said amplifier, and a receiver receiving and amplifying said transmitted output and connecting same to said audio transducer.

9. The apparatus according to claim 8, wherein said receiver and audio transducer are incorporated in a hearing aid to be worn by a user.

10. The apparatus according to claim 9, wherein said pair of pickup coils, amplifier and transmitter are incorporated in the speaker of a telephone handset.

11. A method of increasing the signal-to-noise ratio of a sound signal source which also produces a magnetic field propagated along a magnetic field axis, comprising: providing a pair of magnetic pickup coils of substantially the same electrical and magnetic parameters, but of opposite polarity, which coils are electrically connected together in series and are mounted on separate cores; locating said pair of magnetic pickup coils and their respective cores close to said sound signal source and oriented symmetrically with respect to each other with their core axes substantially parallel to each other and substantially perpendicular to the magnetic field axis of the sound signal source axis; adding and amplifying the outputs of the pair of pickup coils in an amplifier; and converting the outputs of said amplifier to sound.

12. The method according to claim 11, wherein said pair of pickup coils are located a distance of no more than 3 cm from said sound signal source.

13. The method according to claim 11, wherein said pair of pickup coils are located a distance of less than 3 cm from each other.

14. The method according to claim 11, wherein said sound signal source is a telephone speaker.

15. The method according to claim 11, wherein said sound signal source is a dynamic speaker having a magnetic core.

16. The method according to claim 11, wherein said sound signal source is a telephone speaker incorporated into the receiver/earpiece section of a telephone handset.

17. The method according to claim 11, wherein said audio transducer is connected to said amplifier by a wire connection.

18. The method according to claim 11, wherein said audio transducer is connected to said amplifier by a transmitter transmitting the output of said amplifier, and a receiver receiving and amplifying said transmitted output and connecting same to said audio transducer.

19. The method according to claim 18, wherein said receiver and audio transducer are incorporated in a hearing aid to be worn by a user.

20. The method according to claim 19, wherein said pair of pickup coils, amplifier and transmitter are placed near the speaker of a telephone handset.

* * * * *